United States Patent
Srivastava et al.

(10) Patent No.: US 12,256,218 B2
(45) Date of Patent: Mar. 18, 2025

(54) SEPARATE NETWORK SLICING FOR SECURITY EVENTS PROPAGATION ACROSS LAYERS ON SPECIAL PACKET DATA PROTOCOL CONTEXT

(71) Applicant: Intel Corporation, Santa Clara, CA (US)

(72) Inventors: Amar Srivastava, Bangalore (IN); Christian Maciocco, Portland, OR (US); Kshitij Arun Doshi, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 664 days.

(21) Appl. No.: 17/484,811

(22) Filed: Sep. 24, 2021

(65) Prior Publication Data

US 2023/0095715 A1  Mar. 30, 2023

(51) Int. Cl.
- *H04L 29/06* (2006.01)
- *H04W 12/121* (2021.01)
- *H04W 12/48* (2021.01)
- *H04W 72/04* (2023.01)

(52) U.S. Cl.
CPC ......... *H04W 12/121* (2021.01); *H04W 12/48* (2021.01); *H04W 72/04* (2013.01)

(58) Field of Classification Search
CPC .... H04W 12/121; H04W 12/48; H04W 72/04
See application file for complete search history.

(56) References Cited

U.S. PATENT DOCUMENTS

| 7,571,474 | B2 |  | 8/2009 | Ross et al. | |
|---|---|---|---|---|---|
| 10,165,447 | B2 | * | 12/2018 | Raleigh | H04L 63/0892 |
| 12,096,253 | B2 | * | 9/2024 | Kahn | H04L 1/22 |
| 2015/0156674 | A1 | * | 6/2015 | Tan | H04W 12/06 370/230 |
| 2020/0178320 | A1 | * | 6/2020 | Dowlatkhah | H04W 8/04 |
| 2022/0361080 | A1 | * | 11/2022 | Soliman | H04W 40/02 |

FOREIGN PATENT DOCUMENTS

| WO | WO-2020171765 A1 | * | 8/2020 | |
|---|---|---|---|---|
| WO | WO-2020204949 A1 | * | 10/2020 | H04L 1/22 |

OTHER PUBLICATIONS

Kabir et al., "Implementing a Security Policy Management for 5G Customer Edge Nodes", NOMS 2020—2020 IEEE/IFIP Network Operations and Management Symposium, Date of Conference: Apr. 20-24, 2020.*

* cited by examiner

*Primary Examiner* — Morshed Mehedi
(74) *Attorney, Agent, or Firm* — Schwegman Lundberg & Woessner, P.A.

(57) ABSTRACT

An apparatus and system to provide separate network slices for security events are described. A dedicated secure network slice is provided for PDP data from a UE. The network slice is used for detecting security issues and sending security-related information to clients. The communications in the dedicated network slice are associated with a special PDP context used by the UE to interface with the network slice. Once the UE has detected a security issue or has been notified of the security issue on the network or remote servers, the UE uses a special PDP service, and is able to stop uplink/downlink channels, close running applications and enter into a safe mode, cut off connections to the networks, and try to determine alternate available connectivity.

20 Claims, 7 Drawing Sheets

SEPARATE NETWORK SLICING FOR SECURITY EVENTS PROPAGATION ACROSS LAYERS ON SPECIAL PACKET DATA PROTOCOL CONTEXT

TECHNICAL FIELD

Embodiments pertain to fifth generation (5G) wireless communications and next generation wireless network. In particular, some embodiments relate to network slicing in a 5G network. In particular, some embodiments relate to security event propagation across layers using network slicing.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
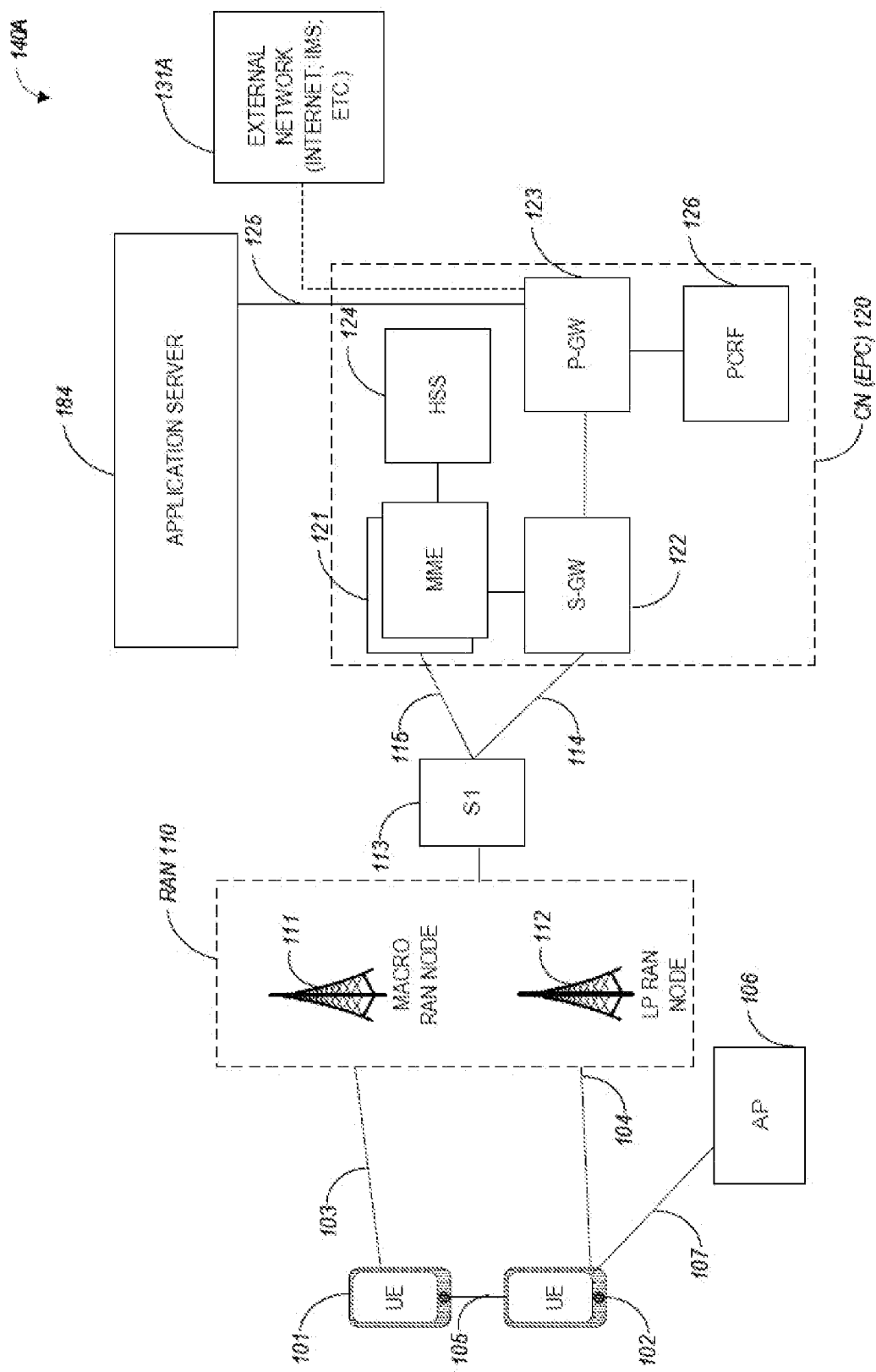
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to next generation wireless networks, e.g., 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of next generation RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 max alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells air picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

Figure 1B:
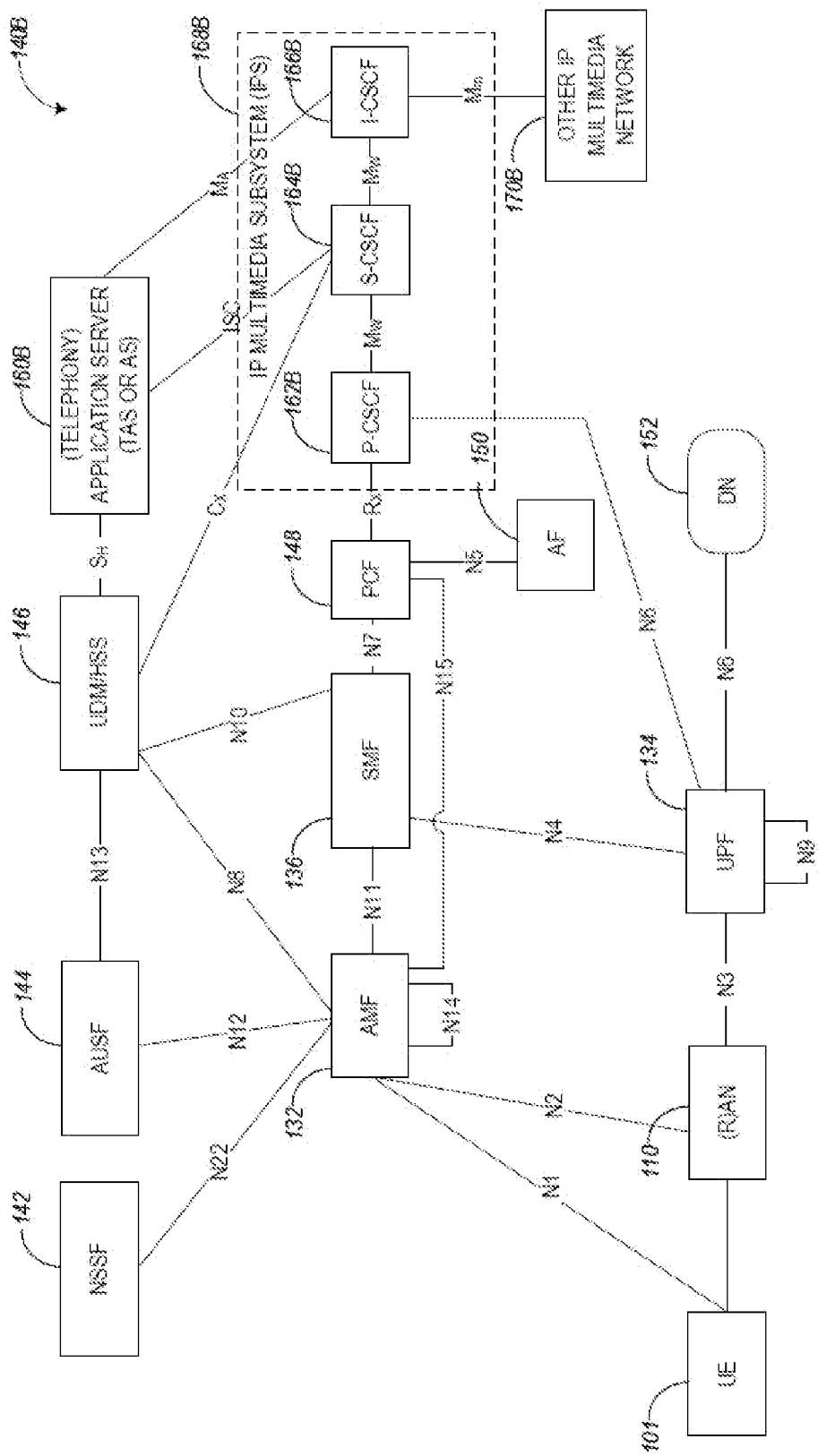
FIG. 1B illustrates a non-roaming 5G system architecture in accordance with some aspects.
Figure 1C:
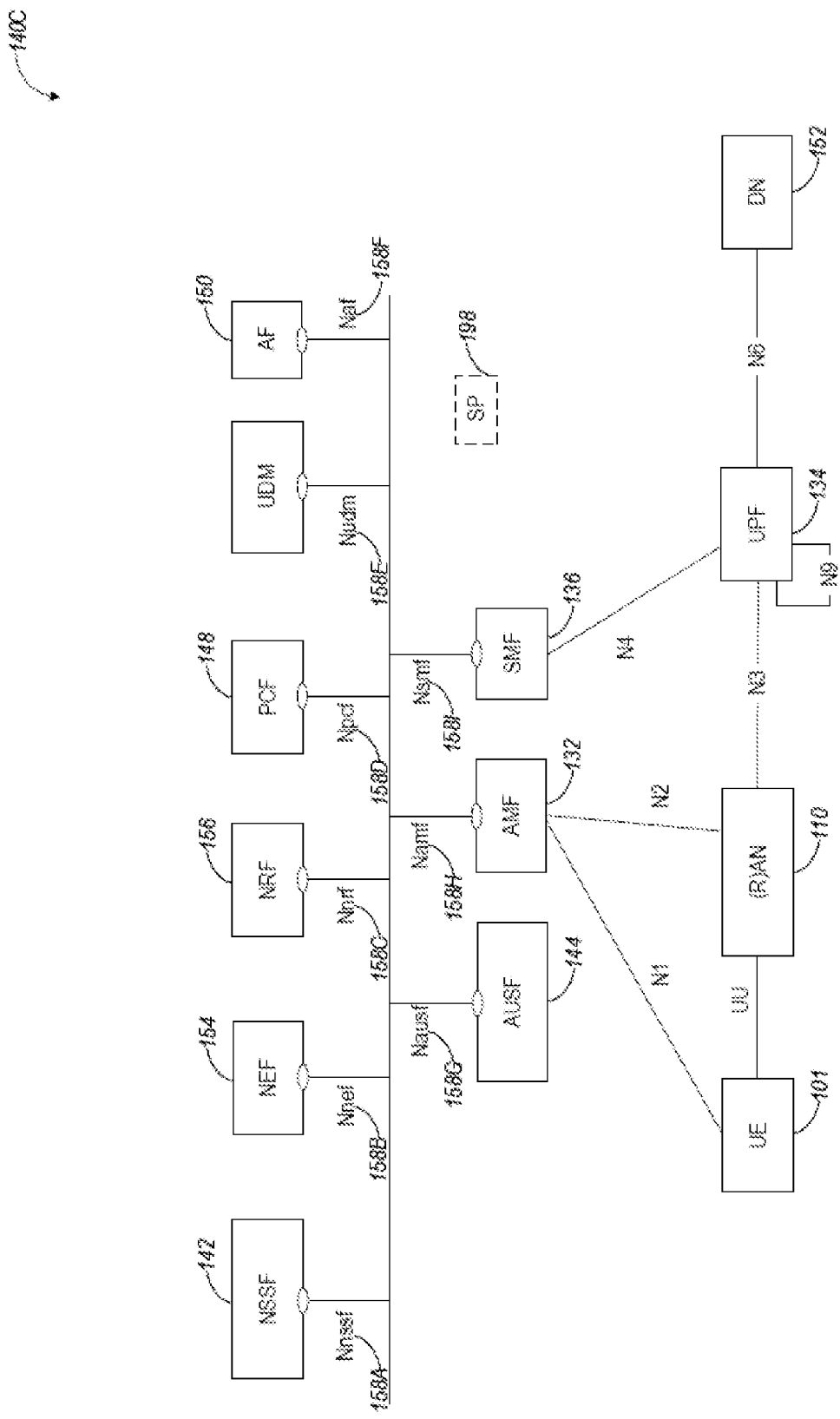
FIG. 1C illustrates a non-roaming 5G system architecture in accordance with some aspects.

The RAN 110 is shown to be communicatively coupled to a core network (CN) 120 via an S1 interface 113, in aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The NG-RAN 110 can include a plurality of nodes, such as gNBs and NG-eNBs. The 5G system architecture 140B includes a plurality of network functions (NFs), such as an access and mobility function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The AMF 132 and the UPF 134 can be communicatively coupled to the gNBs 110 and the NG-eNBs via NG interfaces. More specifically, in some aspects, the gNBs 110 and the NG-eNBs can be connected to the AMF 132 by NG-C interfaces, and to the UPF 134 by NG-U interfaces. The gNBs and the NG-eNBs can be coupled to each other via Xn interfaces.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or public safety access point (PSAP). The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2. (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown). N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

New radio vehicle-to-everything (NR-V2X) architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
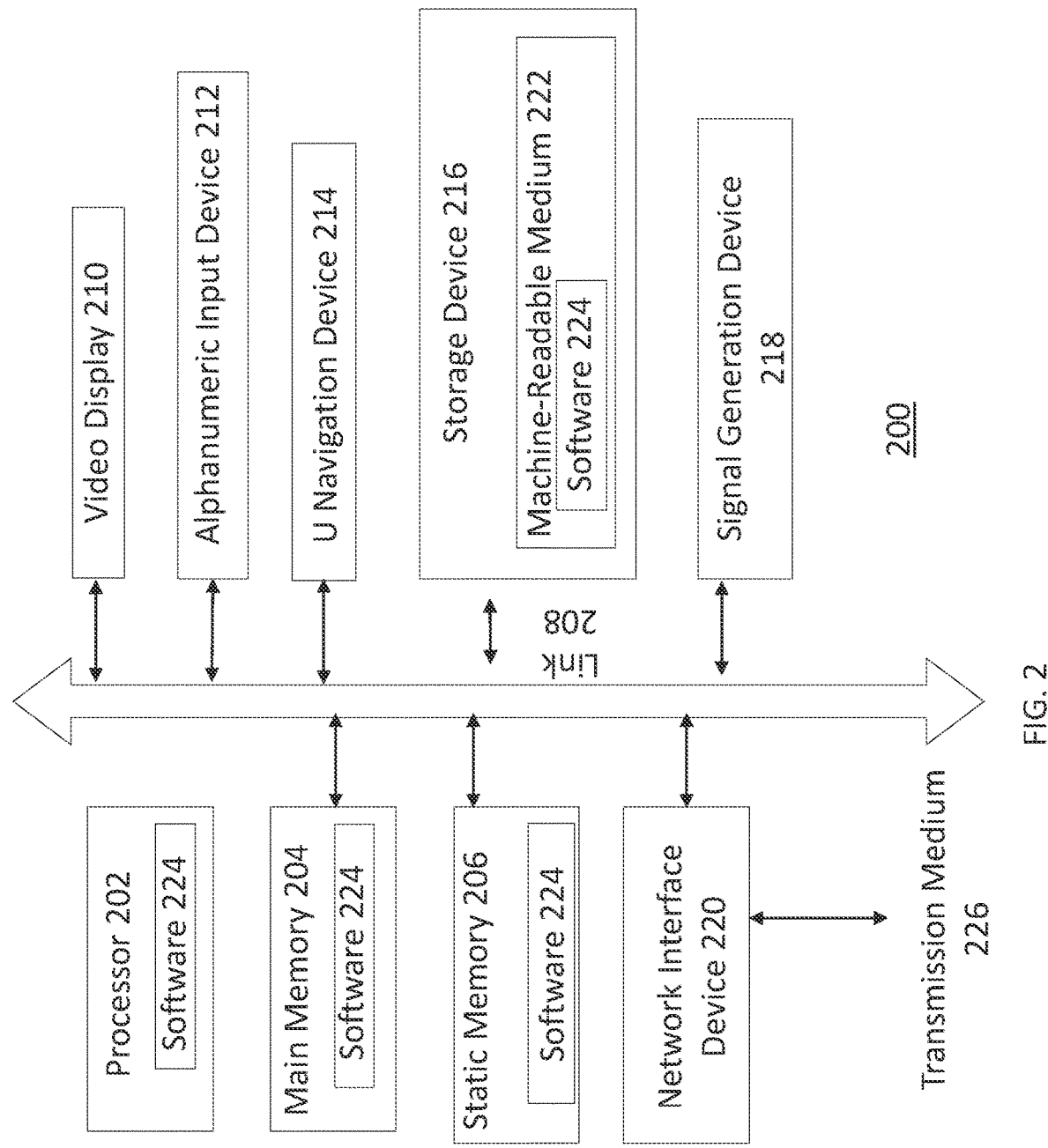
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc,) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed. Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz hands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5A (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan). 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz. 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP fifth generation (5G) communication systems, etc. Still, a UE may take this role as well and act as an AP, eNB, or gNB; that is some or all features defined for network equipment may be implemented by a UE.

Turning specifically to security issues, a large number of serious security breaches have happened in recent years. These security breaches include compromise of cloud-based infrastructure and on premises data centers. Some examples: Dropbox hack, Big-Basket 20 million subscriber data leak, 3.5 million users data leak—Mobikwik, amazon server infected, etc.

While large cloud service providers (CSPs) and data center operators implement surveillance and defense countermeasures and engage mitigation protocols when attacks are detected, clients of these server/services providers face even greater threats. One of these threats is that even as network/cloud infrastructures become compromised, the client devices do not receive any notifications of abnormality or threat detection. The client devices keep sending data and other information to networks that may have been compromised, whereas the client devices should have been informed or given a choice to choose either different networks or stop interacting with compromised networks. Further, more attacks can extend to a client device and infect the client device, while if the client device had been warned about the compromised network the client device could take proactive actions.

Figure 3:
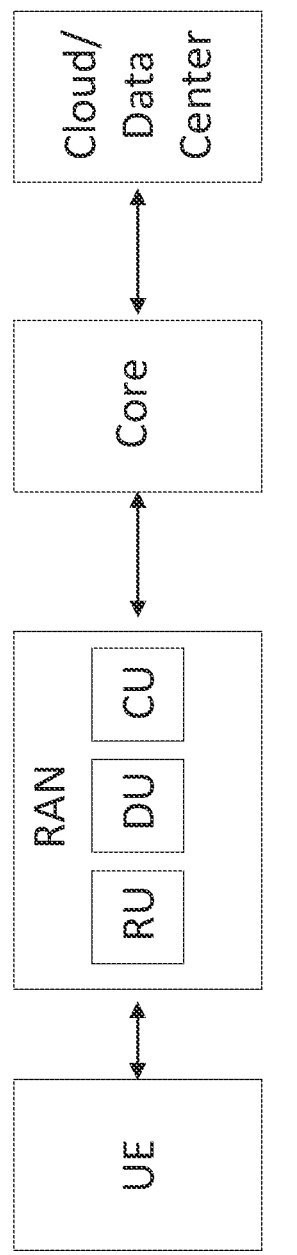
FIG. 3 illustrates a high level architecture in accordance with some aspects.
Figure 4:
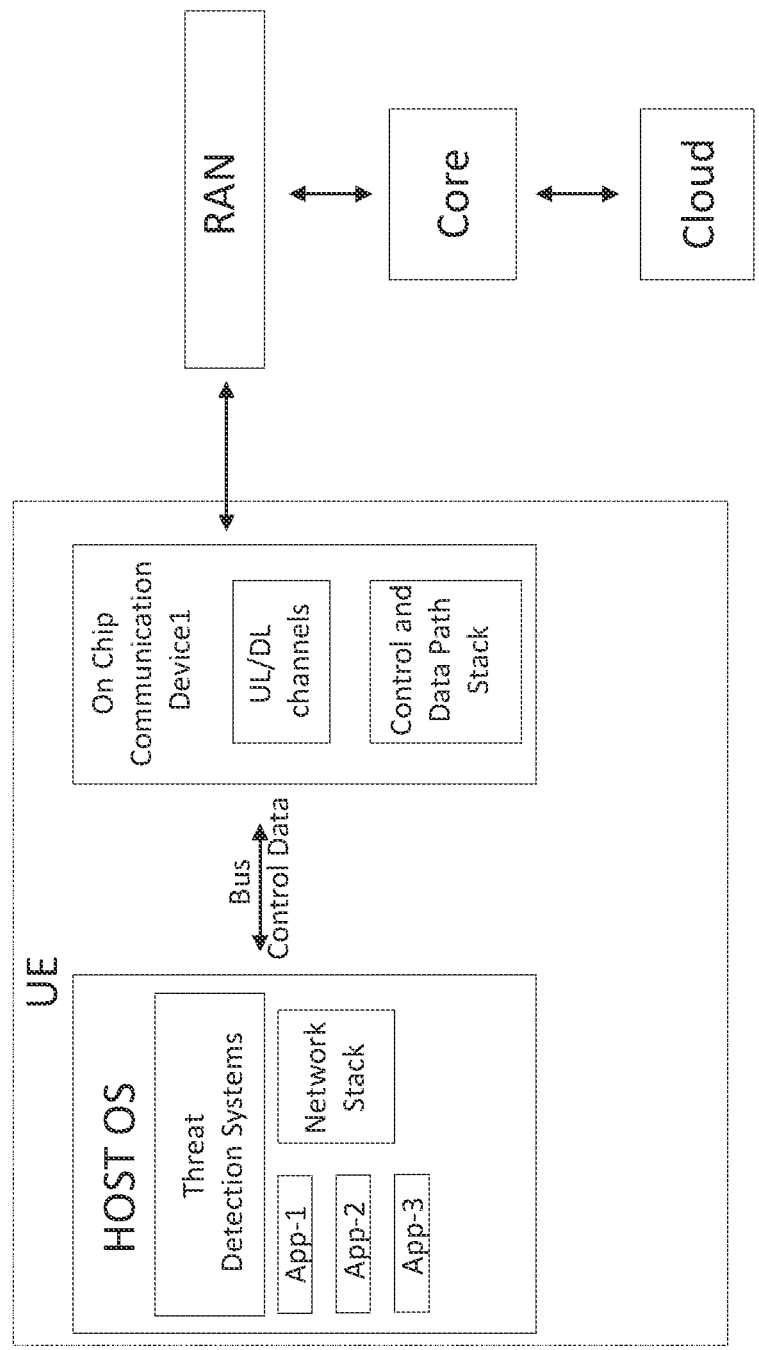
FIG. 4 illustrates a detailed architecture in accordance with some aspects.

Device-to-server attacks also becoming more prevalent with internet-of-things (IoT) devices, e.g., Botnet attack-Mirai where IoT hot devices targeted and put down secured major sites (e.g. GitHub, Twitter, Reddit, Netflix Airbnb). If a client device becomes compromised, there is no standard secured way through which the client device can safely notify the server and server can take precautionary steps. Hackers usually start distributed denial of service (DDOS) type of attacks from a few client devices and then eventually increase attack intensity by slowly converting more client devices into bot devices. FIG. 3 illustrates a high level architecture in accordance with some aspects. FIG. 4 illustrates a detailed architecture in accordance with some aspects.

A framework is disclosed herein to propagate critical security events to and from the network and inform authorized client devices/servers of security issues. The client device takes proactive countermeasures that are engaged when a network violation occurs. Similarly, the server can take proactive countermeasures if a client device becomes infected. The client device has a dedicated network slice that is to be provisioned with a set of sequestered resources and run at higher priority than at least some other services.

The dedicated network slice is used both for detecting security issues and for sending security related critical information to clients without delays or deadlocks. Having its own dedicated resources prevents the dedicated network slice from having to depend on the correct operation of other, potentially compromised, infrastructure. In addition, having a higher priority that other tasks prevent the operations on the dedicated network slice from being delayed by other logjams from infrastructure issues directly or indirectly caused by an attack. A dedicated slice can watch over client devices and take preventive actions on getting prior information about client device abnormal health.

In addition, a second dedicated slice may be deployed that is shared between potentially multiple first dedicated slices (each of the first dedicated slices serving a different end-to-end path). The second dedicated slice is used as a resource pool. The second dedicated slice pools together resources so that the second dedicated slice can perform any deep packet inspection (DPI) or other compute-intensive actions as a resources sidecar that is outside the main path of the communications. One benefit is that this makes the first dedicated paths more robust as the first dedicated paths do not have to offload any of their compute intensive security actions on to slices that may be prone to attacks. A hierarchy of dedicated network slices may be present in which each provides an additional layer of security depending upon the platform capabilities.

The communications in the dedicated network slice are associated with a special packet data protocol (PDP) context. An application on a client device would, in general, have one or more PDP contexts, and a special extra PDP context for interfacing with the secure network slice. Once a device has itself detected an attack or has been notified of such on the network or remote servers, the device utilizes a special PDP service, can stop uplink/downlink channels, close down running applications and enter into a "safe mode", and cut off connections to the networks and try to determine alternate connectivity available or take other possible actions.

Figure 5:
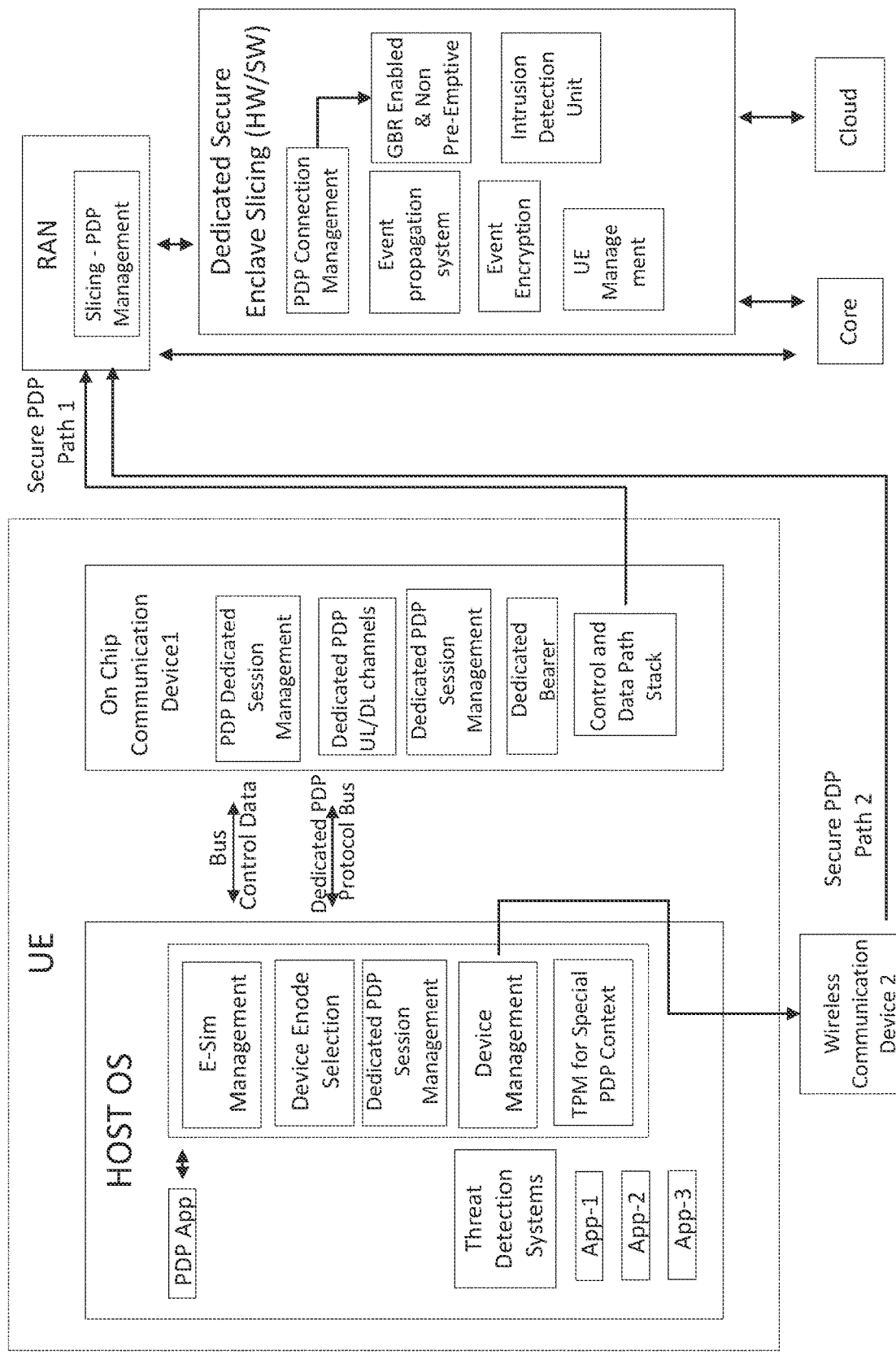
FIG. 5 illustrates another detailed architecture in accordance with some aspects.

FIG. 5 illustrates another detailed architecture in accordance with some aspects. FIG. 5 illustrates a UE, another wireless communication device, a RAN, a core network, a public cloud, and dedicated secure enclave slicing hardware and software. Each of these may have some or all of the elements shown in FIG. 2.

The UE contains a host operating system (OS) operating on a processor that controls an on-chip communication device (e.g., modem) via a control bus. The OS may be, for example, Windows or Linex. A separate bus may be used for the dedicated PDP protocol, as indicated above. Several applications (apps) and threat detection systems may be operating based on the host OS. Some of the apps (e.g., game apps) may not use a secure connection. One or more of the apps, a PDP app may communicate with a chip/modem or other module that provides PDP-related functions and may use a secure connection for communication. One of the functions includes management of the UE E-sim to switch connections/vendors without switching hardware. Another of the functions is selection of different on-chip communication devices for external communication by the 15E. As shown, one of the functions is management of a dedicated PDP session to support the PDP app, which includes initiating and maintaining the dedicated PDP session, as well as communicating (receiving and transmitting) security notifications. The functions also include device management of internal and external devices, the latter of which includes the other wireless communication device, to provide a secondary secure PDP path to the RAN. This may be effected using any supported protocol, such as BT, etc. .
. . . A Trusted Platform Module (TPM) may be used to manage special PDP contexts to support the PDP app, including authentication and authorization for the special PDP context.

The on-chip communication device (modem) may include modules that also provide PDP-related functions, which include management of: the dedicated PDP session, dedicated PDP uplink/downlink channels, one or more dedicated bearers. In addition, the on-chip communication device may control both the control and data path stack of a primary secure PDP path to the RAN.

The RAN includes management of the PDP slices. The dedicated secure enclave slicing hardware and software may provide management of the PDP connection, including guaranteed bit rate (GBR)-enabled, non-preemptive bearer. The dedicated secure enclave slicing hardware and software further provides an event propagation system, event encryption and UE management, as well as intrusion detection unit. The intrusion detection unit provides a number of functions. The intrusion detection unit provides static flow analysis and DPI. The intrusion detection unit also provides authentication and authorization inspection, as well as other security tools (such as MIMT).

As shown in FIG. 5, network level dedicated slicing is provided at one or more of the RAN, core, and/or data level, where the slicing area attack surface has been hardened for security. The dedicated network slice may communicate to other data processing slices for detecting/analysis. The dedicated network slice may also have dedicated compute and memory/storage resources.

In some embodiments, various compute- and communication-intensive normal operations may be offloaded from the dedicated slice to other network slices. This may permit the dedicated network slice to remain highly performant and readily available for enforcing various security measures and communicating with urgency when needed. The dedicated network slice can be used to exchange security relevant information between the different entities but also on the end of the slice in the computing devices to perform security-related work. The compute- and communication-intensive operations that are not run on the dedicated network slice include, for example, various data plane activities including deep packet inspection (DPI) or other computationally-expensive network security forensic operations.

As shown in FIG. 5, the UE may use a special PDP context-based connection with the dedicated network slice. In some embodiments, a virtual packet data network (PDN) may be employed without any UEs. The special PDP context may be used to avoid circumstances in which a regular communication channel to a UE is compromised and one cannot be sure of an uncompromised notification being delivered to the UE; neither can one be certain that even an uncompromised notification that reaches the UE will be allowed in by an attacker.

For the special PDP context, additional security validation, e.g., authentication, etc. are performed. For authentication, the client device can use an existing or dedicated TPM chip to maintain a secure key for managing PDP contexts only for all client applications. During normal operation, once the UE is informed of a possible attack, the UE can take appropriate actions. Examples of appropriate (defensive) actions include blocking the UE data pipe, cutting a connection with a particular access point name (APN), and performing additional security measures. In addition, the UE can inform the host apps as well.

On the host application side, in addition to establishing normal connectivity, an app may establish a special PDP service, for the duration of its connectivity or activated at particular times when desired by users/apps. In one example, when a financial app performs a transaction, the financial app intends to connect to the dedicated network slice for security events only.

The special PDP connection may also be billed separately by the operator or offered to differentiate services. Separate PDP context billing technology (determined, e.g., by the PCF) may be used in this case.

In some embodiments, a short-term use resource slice may be provided. The short-term use resource slice may contain dynamically-varying virtualized resources (memory, processing units, networking hardware) that are contributed to a dedicated resource slice on a short term basis. The dedicated secure enclave slice can use the short-term use resource slice for scaling purposes in a manner transparent to other network slices. For example, if the dedicated secure enclave slice is tasked to perform low latency data analytics but does not have sufficient CPU or memory resources to perform the processing in a predetermined allotted time frame, the dedicated secure enclave slice can first look to offload a sufficient amount of processing into the short-term use resource slice to enable the predetermined allotted time frame deadline to be met before generating a request to the RAN and CORE networks for such scaling. In other words, the short-term use resource slice provides a short-term borrowing facility to the secure enclave slice but does not use advance pledging of resources for an indefinite term from other peers.

The use of the dedicated secure network slice and system described provides a way to propagate critical security events on an alternate channel from the server or network to UEs and vice versa, which may, in some cases, be blocked by malicious code. The dedicated secure network slice may thus be used to propagate information to various devices. In addition, the dedicated secure network slice may be used to determine in security other network slice as well as providing secure PDP communication using a GBR-enabled, non-preemptive bearer that has a highest priority and essentially cannot be interrupted. The dedicated secure network slice may use a special security PDP context, unlike normal network slices, which may use a normal PDP context. This may permit the UE and server to be able to take precautionary measures and prevent further damage, such as reducing the possibility of DDOS attacks. The UE may be able to take actions such as closing one or more apps, controlling the 5G hardware (e.g., the on-chip communication device/ modem) to filter or terminate communications on compromised channels, block IP addresses and/or services from a compromised (or malicious) server, inform other devices (including local devices via WiFi, Bluetooth or other protocols), select other communication paths, and propagate security event notifications to the server, CN, RAN and other devices.

The dedicated secure network slice, unlike normal network slices, may be limited in functionality to the security aspects described and may avoid being used to transmit data from normal, non-special security PDP context apps. The dedicated secure network slice may set a hierarchy of security for the normal network slices.

In addition, cloud networks typically use multi-tenancy architectures in which it is possible that one tenant (company A) can knowingly or unknowingly infect other tenant (company B). If an attack is detected, with a multi-sim arrangement (virtual sim/E-sins), the UE can chose to, among others, ignore a particular compromised APN, chose another APN, and inform other devices (e.g., in an IOT Network) to prevent the other devices from getting infected. If the UE becomes compromised, the UE (security/antivirus system) can also inform the server using the alternate secure PDP channel. If the server detects more than one similar type of behavior from multiple UEs, the server can prepare itself for possible severe attacks (i.e., DDOS) which is typically difficult to detect. For wireless devices in which the bandwidth is limited and jamming, congestion attacks may be common, any agent/UE pre-security event information can alert an administrator and precautionary actions can be taken. A congestion attack may be, for example, on a dedicated short-range communication (DSRC) channel in automotive systems causing the inability of automobiles to communicate critical events to other automobiles in due time, which can have a disastrous impact.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising:
processing circuitry configured to:
encode, for transmission to a radio access network (RAN), data from an app using a communication channel;
determine an occurrence of a malicious security event associated with at least one of the RAN, a core network of the RAN, or a remote server related to transmission of the data; and
in response to a determination of the occurrence of the malicious security event:
initiate use of a secure packet data protocol (PDP) path associated with a dedicated secure network slice to communicate PDP data, the secure PDP path associated with a secure PDP context to interface with the dedicated secure network slice, and
take action to secure communication of data with the at least one of the RAN, core network of the RAN, or remote server related to transmission of the data; and
a memory configured to store the secure PDP context.

2. The apparatus of claim 1, wherein the processing circuitry is configured to determine the occurrence of the malicious security event based on reception of a notification of the malicious security event from the RAN.

3. The apparatus of claim 1, wherein the secure PDP context provides a guaranteed hit rate (GBR)-enabled, non-preemptive bearer.

4. The apparatus of claim 1, wherein the action is selected from a group of predetermined actions that include: termination of uplink and downlink channels to the RAN, termination of apps currently in operation that use a non-secure PDP context and entry into a safe mode, elimination of connections to the RAN, and a determination of alternate available connectivity to the RAN.

5. The apparatus of claim 1, wherein the action comprises providing an indication to host apps of a host operating system of the malicious security event for the host apps to establish a PDP service that uses the secure PDP path.

6. The apparatus of claim 1, wherein the processing circuitry is configured to, in response to activation of a host app, establish a PDP service that uses the secure PDP path for a duration of connectivity of the host app.

7. The apparatus of claim 1, wherein the processing circuitry is configured to activate, for a particular host app, a PDP service that uses the secure PDP path in response to generation of specific PDP data by the particular host app for transmission using the secure PDP path.

8. The apparatus of claim 1, wherein the processing circuitry is configured to use a dedicated Trusted Platform Module (TPM) chip in a modem to maintain secure keys to manage PDP contexts only for client applications.

9. The apparatus of claim 1, wherein the processing circuitry is configured to select the secure PDP path from between a first secure PDP path provided using an on-chip communication device and a second secure PDP path provided using another wireless communication device in communication with the UE.

10. The apparatus of claim 1, wherein the processing circuitry is configured to determine that an access point name (APN) has been compromised, select another APN for routing of the PDP data, and indicate other UEs that the APN has been compromised.

11. An apparatus for a radio access network (RAN), the apparatus comprising:
processing circuitry configured to:
determine an occurrence of a malicious security event associated with at least one of the RAN, a core network associated with the RAN, or a remote server; and
in response to a determination of the occurrence of the malicious security event:
indicate the occurrence of the malicious security event to a user equipment (UE), and
establish a dedicated secure network slice for communication of packet data protocol (PDP) data between the UE and a cloud server using a secure PDP path associated with a secure PDP context to interface with the dedicated secure network slice; and
a memory configured to store the secure PDP context.

12. The apparatus of claim 11, wherein the processing circuitry is configured to offload data plane activities of the UE including deep packet inspection (DPI) of the PDP data to a non-secure network slice to reduce performance times of security measures associated with the PDP data.

13. The apparatus of claim 12, wherein the processing circuitry is configured to:
determine additional resources, for scaling purposes, that are unable to be provided by the dedicated secure network slice,
provide the additional resources through allocation of resources of a short-term use resource slice that contains dynamically-varying virtualized resources without advance pledging of resources for an indefinite term from peers, and
remove the allocation in response to a determination that the additional resources are no longer to be used by the dedicated secure network slice.

14. The apparatus of claim 11, wherein the processing circuitry is configured to, in response to the indication to the UE of the occurrence of the malicious security event, determine that termination by the UE of uplink and downlink channels to the RAN has occurred.

15. The apparatus of claim 11, Wherein the secure PDP path is selected from a first secure PDP path provided using an on-chip communication device of the UE and a second secure PDP path provided using another wireless communication device in communication with the UE.

16. The apparatus of claim 11, Wherein the processing circuitry is configured to, in response to the determination of the occurrence of the malicious security event associated with a plurality of UEs that provide PDP data to the cloud server, provide an indication to the cloud server of a potential distributed denial of service attack.

17. A non-transitory computer-readable storage medium that stores instructions for execution by one or more processors of a user equipment (UE), the one or more processors to configure the UE to, when the instructions are executed:
encode, for transmission to a radio access network (RAN), data from a non-secure app using a communication channel;
determine an occurrence of a malicious security event associated with at least one of the RAN, a core network of the RAN, or a remote server related to the data based on reception of a notification of the malicious security event from the RAN; and
in response to a determination of the occurrence of the malicious security event, initiate use of a secure packet data protocol (PDP) path associated with a dedicated secure network slice to communicate PDP data, the secure PDP path associated with a secure PDP context to interface with the dedicated secure network slice, and take action to secure communication of data with the at least one of the RAN, core network of the RAN, or remote server related to transmission of the data.

18. The medium of claim 17, wherein the action is selected from a group of predetermined actions that include: termination of uplink and downlink channels to the RAN, termination of apps currently in operation that use a non-secure PDP context and entry into a safe mode, elimination of connections to the RAN, and a determination of alternate available connectivity to the RAN.

19. The medium of claim 17, wherein the instructions when executed further configure the one or more processors to select the secure PDP path from between a first secure PDP path provided using an on-chip communication device and a second secure PDP path provided using another wireless communication device in communication with the UE.

20. The medium of claim 17, wherein the instructions when executed further configure the one or more processors to determine that an access point name (APN) has been compromised, select another APN for routing of the PDP data, and indicate other UEs that the APN has been compromised.

* * * * *